Feb. 24, 1942.  W. C. CARTER  2,274,038
DISK PLOW
Filed Dec. 4, 1939
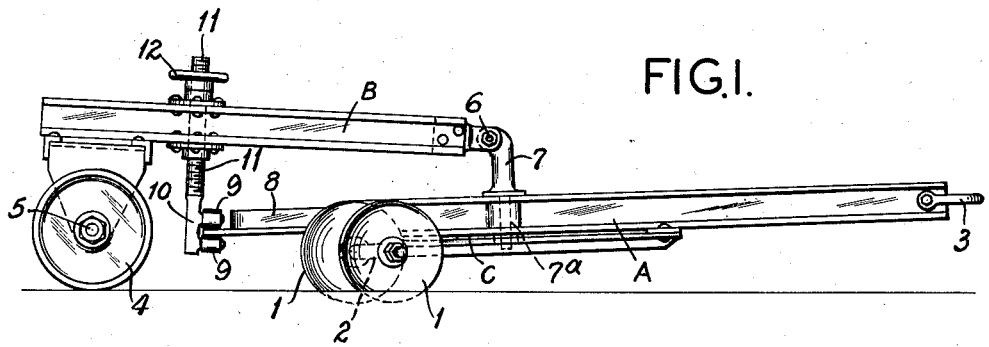
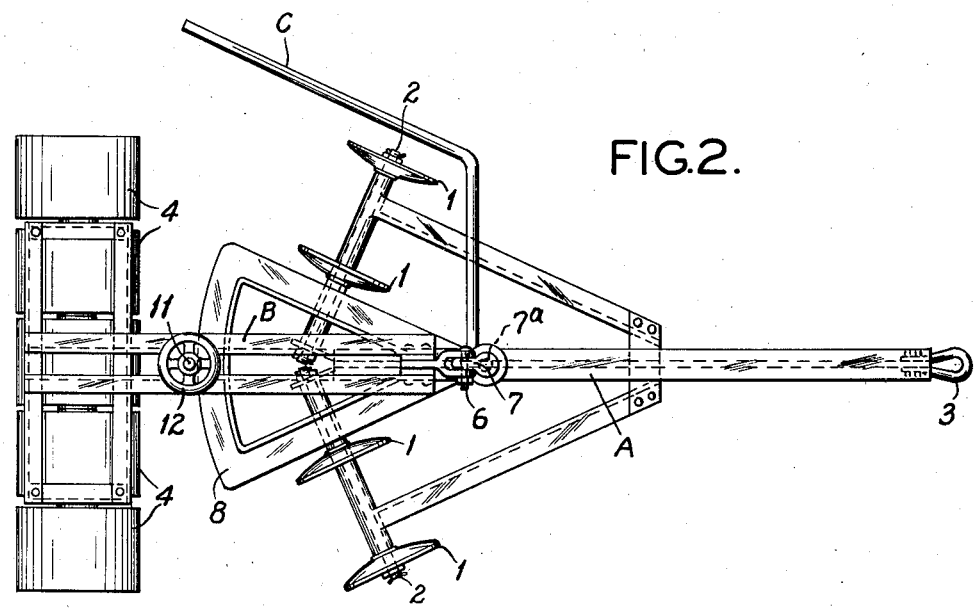
INVENTOR;
WILLIAM C CARTER
BY *Wells R Church*
ATTORNEY Patented Feb. 24, 1942

2,274,038

UNITED STATES PATENT OFFICE 2,274,038

DISK PLOW

William C. Carter, Fulton, Ky.

Application December 4, 1939, Serial No. 307,365

11 Claims. (Cl. 55—12)

This invention relates to agricultural machinery of the general type that is used for preparing ground for planting or seeding, and particularly, to agricultural machines of the kind that are intended to be connected to the draw bar of a tractor.

One object of my invention is to provide a tractor-operated machine of novel construction, which, in addition to combining the functions of a turning plow and a disk harrow, is of such design that it will turn under weeds, and effectively cultivate the ground, without burying the weeds so deeply as to destroy the fertilizing effect of the weeds and cause wild seeds to be left in the ground in a condition or at the point where they may constitute a source of annoyance in future years.

Another object is to provide a disking machine of the kind referred to that is constructed in a novel manner which makes it possible for the disk to penetrate hard ground and also travel over soft or mellow ground, without danger of sinking too deeply into the ground.

Another object of my invention is to provide a machine of the general character above described, whose co-acting parts are constructed and combined in a novel manner that makes it possible for the user to regulate the depth of the cut made by the disks and also to shift the disks into such a position that they will not engage or contact with the ground or roadway over which the machine travels when the machine is in an inoperative condition and is being moved from one place to another.

And still another object of my invention is to provide a disking machine that is equipped with a means for flattening down corn stalks and high weeds located adjacent to but at one side of the path of travel of the machine, thereby causing said corn stalks or weeds to be disposed or arranged so that they will be severed or cut into short lengths on the reverse trip of the machine over the ground in which said corn stalks or weeds are growing. Other objects and desirable features of my invention will be hereinafter pointed out.

Figure 1 of the drawing is a side elevational view of a machine constructed in accordance with my invention; and Figure 2 is a top plan view of said machine.

In the accompanying drawing which illustrates one form of my invention, A designates as an entirety a frame that serves as a support or carrier for a plurality of conventional cutting disks 1. The machine may be equipped with any desired number of disks, and they may be arranged in various ways, without departing from the spirit of my invention. In the machine herein illustrated the frame A comprises two horizontally-disposed shafts or axles 2 disposed at an angle to each other, so as to form, in effect, a substantially V-shaped disk-supporting means, and two groups of disks are rotatably mounted on said means, so that when the machine is in operation, the disks 1 will cut furrows in the ground and throw the soil towards the longitudinal axis of the machine. The frame A, which may be of any preferred shape or construction, is adapted to be attached to a tractor, whose draw bar or equivalent part, prevents the front end of the frame A from moving upwardly. I have herein shown the frame A as being provided at its front end with a conventional clevice 3, but I have not shown the tractor, as it is well understood by those skilled in this art that the tractor is provided with a draw bar or equivalent part, which, when connected with the front end of the frame A, overcomes any tendency of the front end of said frame to rise or move upwardly.

A roller 4 may be arranged either behind or in front of the disks 1. It is herein illustrated as being arranged behind or at the rear of the disks 1, and said roller is preferably disposed transversely of the machine. Said roller may consist of a single unit or continuous roller, or it may be made up of a plurality of relatively short rollers rotatably mounted on a supporting shaft or axle 5. The roller 4 always remains in contact with the ground and is combined with the disks 1 in such a way that said roller is normally held against vertical movement relatively to said disks, but is capable of swinging or turning as a unit relatively to the disks in a horizontal direction, so that the roller will track properly when the machine makes a turn while it is in use. However, in order that the depth of the cut made by the disks may be regulated, and in order that the disks may be shifted into an inactive position when the machine is not in use and is being transported from one place to another, means is provided for enabling the disks 1 to be raised or lowered relatively to the roller 4, said means being either manually operated or automatically operated.

In the machine herein illustrated the roller 4 is mounted on or within a supporting frame B that projects rearwardly beyond the rear end of the frame A. Said roller supporting frame B is pivotally attached at 6 to a bracket or fixture 7, which, in turn, is joined to the frame A by a king pin 7ª. The roller supporting frame B is provided with a means that co-acts with a means on the frame A to normally hold said two frames against relative vertical movement. Usually, the frame A will be provided with a rigid, horizontally-disposed track 8 that is embraced by a bifurcated part carried by the frame B, thus causing the frames A and B to interlock with each other in such a way that one frame cannot move vertically relatively to the other, but the roller supporting frame B can swing or turn relatively to the disk supporting frame A, due to the pivotal connection between said frames formed by the king pin 7ª used to attach the bracket 7 to the frame A. Preferably the bifurcated part on the frame B that embraces the track 8 on the frame A is formed by a pair of small guide rollers 9 arranged to engage the top and bottom sides of said track 8, as shown in Figure 1, and mounted on a vertically-adjustable supporting member 10 on the frame B. In the machine herein illustrated the member 10 that carries the guide rollers 9 can be raised and lowered manually by turning a shaft 11 mounted in a threaded bearing in the frame B, and provided at its upper end with a hand wheel 12. Normally, the frame B is adjusted so that the cutting edges of the disks 1 will be set lower than the ground-engaging surface of the roller 4, thereby producing a machine in which the disks are carried by a frame A whose front end is held against vertical movement by the weight of the tractor, which operates the machine, and whose rear end is subjected to a weight, load or downward force (the roller 4) that positively forces the disks into the ground when the machine is traveling over hard ground. When the machine is traveling over soft or mellow ground, the depth of the cut made in the ground by the disks 1 is limited to the distance the cutting edges of the disks project downwardly below the ground-engaging surface of the roller 4, because under such conditions, the roller 4 acts as a support for the rear end of the frame A and the disks 1 mounted thereon. When the machine is to be moved from one place to another, the operator, by manipulating the hand wheel 12, can raise the rear end of the disk supporting frame A sufficiently to prevent the disks 1 from engaging the ground or roadway over which the machine travels.

From the foregoing it will be understood that my broad idea does not consist simply in combining a roller with disks so as to produce a machine, which, in a single operation, will disk the ground and also roll the ground. Instead, my invention consists of a tractor-operated machine having a roller and disks, combined in such a manner that when the machine is in use, the weight of the tractor and the weight of the roller are exerted on the disks in a direction tending to force the disks into the ground, thereby insuring efficient operation of the disks when the machine is traveling over hard ground, and also eliminating the possibility of the disks cutting too deeply into the ground when the machine is traveling over relatively soft ground, due, of course, to the fact that at such times (when traveling over soft ground) the roller acts as a supporting means for the rear end of the frame which carries the disks. One of the outstanding advantages of such a machine is that it will plow ground and turn under weeds without burying the weeds and the wild weed seeds far below the surface of the ground. Due to the fact that the turned under weeds are relatively close to the surface of the ground, they form a good fertilizer for the ground, and inasmuch as the weed seeds are also comparatively close to the surface of the ground, they will sprout and be killed by frost in the following autumn or winter. To state it in another way, my improved machine will turn under weeds in such a manner that the full fertilizing effect of the weeds is utilized and wild seeds from the weeds are not left imbedded in the soil at a depth or point where, in future years, they may be plowed up, or brought sufficiently close to the surface of the ground to permit them to germinate and develop into weeds that constitute a source of considerable annoyance.

In my improved machine the depth of the cut in the ground made by the disks can be accurately regulated, and the disks can be effectively prevented from cutting too deeply into soft or mellow ground. Even relatively hard ground can be effectively cultivated by my improved machine, because the roller and its supporting frame imposes a downward force, thrust or load on the rear end of the disk-supporting frame whose front end is held against vertical movement by the weight of the tractor to which the machine is connected. Ground that is prepared for seeding with my improved machine will be effectively cultivated to a depth of several inches, and weeds that were growing in the ground will be made use of to fertilize the ground, without danger of leaving weed seeds buried in the ground at a depth where they are liable to constitute a nuisance in future years.

Another feature of my improved machine which I believe to be novel, is a device C which is disposed so that when the machine is in operation, said device will flatten down corn stalks or high weeds located adjacent the path of travel of the machine, with the result that such flattened down corn stalks or weeds will be arranged in such a position that on the return trip of the machine over the ground in which said stalks or weeds are growing, the disks will be disposed at practically right angles to the corn stalks and weeds, and hence, will cut them effectively into short lengths. As shown in Figure 2 of the drawing, the device C may be formed conveniently from a horizontally-disposed rod that projects laterally from one side of the machine 4, on which is inclined rearwardly, said rod C being attached to any suitable portion of the disk supporting frame A.

Having thus described my invention, what I claim as new and desire to secure by Letters Patent is:

1. An agricultural machine, comprising a plurality of cutting disks, and a roller combined with said disks in such a way that when the machine is traveling over hard ground the weight of the roller is imposed on the disks in a manner to force the disks into the ground, and when the machine is traveling over soft or mellow ground the roller prevents said disks from cutting too deeply into the ground, said roller and disks also being combined in such a way that the roller can swing and thus properly track or follow the disks when the machine makes a turn while in use.

2. An agricultural machine, comprising a plurality of disks, a roller, and means for combining said disks and roller in such a way that they are normally held against relative movement in a vertical direction, said disks and roller also being combined in such a way that they are capable of a slight relative swinging movement in a horizontal direction.

3. An agricultural machine, comprising a plurality of cutting disks, a roller, separate supporting frames for said disks and roller joined together, and means for normally holding said frames against relative movement in a vertical direction, said frames also being so combined that they are capable of a slight swinging movement relatively to each other in a horizontal direction.

4. An agricultural machine, comprising a plurality of cutting disks, a roller, separate supporting frames for said disks and roller joined together, and means for normally holding said frames against relative movement in a vertical direction, the means for joining the roller supporting frame to the disk-supporting frame consisting of a king pin, means for enabling the disks and roller to be adjusted vertically relatively to each other.

5. An agricultural machine, comprising a plurality of cutting disks, a supporting frame for said disks, a roller, a supporting frame for said roller joined to the disk-supporting frame in such a way as to permit said frames to swing or turn relatively to each other in a horizontal direction, and an adjustable means for normally holding said frames against relative vertical movement but for permitting one of said frames to be adjusted vertically, for the purpose described.

6. An agricultural machine, comprising a plurality of cutting disks, a supporting frame for said disks, a roller, a supporting frame for said roller joined to the disk-supporting frame in such a way as to permit said frames to swing or turn relatively to each other in a horizontal direction, a track on one of said frames, and a means on the other frame that embraces said track so as to hold said frames against relative vertical movement.

7. An agricultural machine, comprising a plurality of cutting disks, a supporting frame for said disks, a roller, a supporting frame for said roller joined to the disk-supporting frame in such a way as to permit said frames to swing or turn relatively to same in a horizontal direction, a track on one of said frames, a device on the other frame that embraces said track so as to hold said frames against relative vertical movement, and means for enabling said device to be adjusted vertically to change the relationship between said disks and roller.

8. An agricultural machine, comprising a plurality of cutting disks, a supporting frame for said disks, a roller, a supporting frame for said roller, a universal connection between the disk-supporting frame and the roller-supporting frame, a horizontally-disposed, rigid track on one of said frames, and vertically-adjustable guide rollers on the other frame that engage the top and bottom sides of said track and thus normally hold said frames against relative vertical movement.

9. An agricultural machine, comprising a plurality of cutting disks, and a device projecting laterally from said machine and disposed so as to flatten down corn stalks and weeds located adjacent the path of travel of the machine, for the purpose of arranging said corn stalks and weeds in a position to be severed practically cross-wise by the cutting disks on the return trip of the machine.

10. An agricultural machine, comprising a plurality of cutting disks, a roller, means for combining said roller and disks in such a way that under certain conditions the roller will force the disks into the ground and under a different condition the roller will support the disks, and a device projecting laterally from the machine and disposed so as to flatten down corn stalks and high weeds located adjacent the path of travel of the machine.

11. An agricultural machine, comprising a frame whose front end is adapted to be supported and maintained at a substantially fixed level by a tractor which pulls the machine over the ground, a plurality of cutting disks carried by said frame, a roller that always remains in engagement with the ground, a second frame supported by said roller and joined by a horizontal pivot to said disk-carrying frame at a point in advance of the rear end of said disk-carrying frame, and a connection between said second frame and the rear end of the disk-carrying frame comprising a vertically-adjustable part on the frame that is interlocked with a part on the other frame so as to rigidly hold the rear end of the disk-carrying frame against vertical movement and maintain the disk in such a position, when the machine is in use, that the weight of the roller is used to force the disks into the ground.

WILLIAM C. CARTER.